June 2, 1925.

G. C. MORRISON

BRUSH CLAMP

Filed June 28, 1923

1,540,139

Inventor
George C. Morrison
By John A. Saul
Attorney.

Patented June 2, 1925.

1,540,139

UNITED STATES PATENT OFFICE.

GEORGE C. MORRISON, OF CALUMET, MICHIGAN.

BRUSH CLAMP.

Application filed June 28, 1923. Serial No. 648,224.

*To all whom it may concern:*

Be it known that I, GEORGE C. MORRISON, a citizen of the United States, residing at Calumet, in the county of Houghton and State of Michigan, have invented certain new and useful Improvements in Brush Clamps, of which the following is a specification.

My invention relates to brush clamps, or the like, the same being provided with means for attaching it to the back of a brush, and has adjustable and locking means for the handle of the brush, so that the same may be operated from any angle.

The object of the invention is to so construct the same that it will be efficient, may be cheaply manufactured, and can be easily attached to or detached from the brush, when desired.

In the drawings forming a part of this specification, and in which like symbols of reference represent corresponding parts in the several views:—

Figure 1:
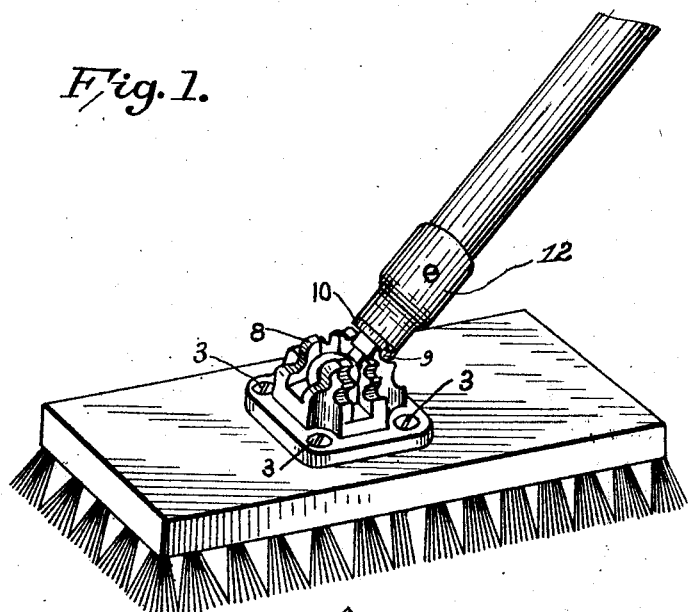
Figure 1 is a perspective view of the invention applied to a brush.
Figure 2:
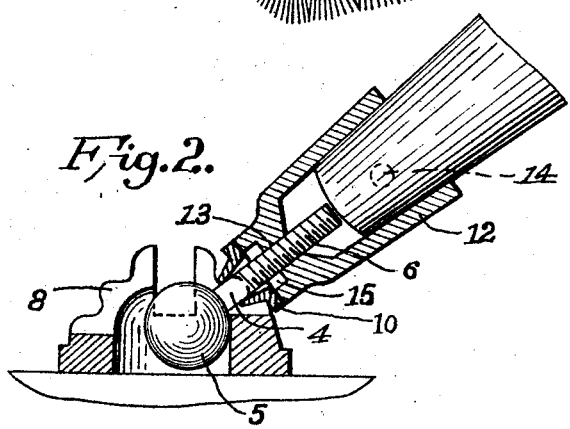
Figure 2 is a vertical section view, illustrating the bolt and its relation to the handle and base.
Figure 6:
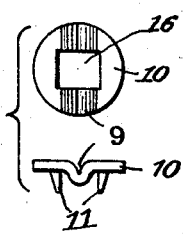
Figure 6 are plan and side views of the washer or key.
Figure 3:
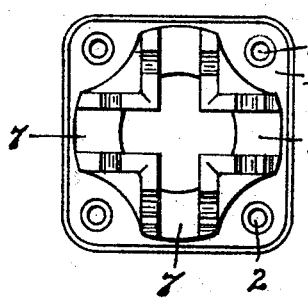
Figure 3 is a plan view of the base piece.
Figure 4:
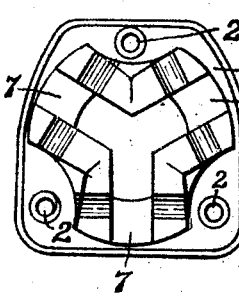
Figure 4 is a modification of the base.
Figure 5:
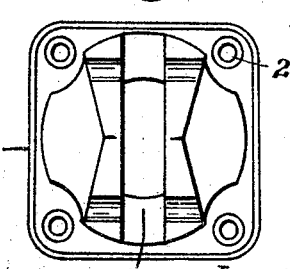
Figure 5 is a further modification, showing the base with only two ways.

In the drawings, 1 represents the base piece for attachment to the brush; 2 holes in the base for screws, as 3; 4 the bolt, composed of ball 5 and screw-shank 6; and 7 the ways formed in the base. The base piece may have four ways, which is the preferred form, or three, two, or more as desired. Formed on the sides of the ways are teeth or projections 8, between which is adapted to operate the projection 9 formed on the washer or key 10, said projection being preferably formed as shown, by the top of the washer being struck down. There is also formed on the key teeth 11, and said teeth are adapted to be received in the ways and prevent the key from rotating during the angular adjustment of the handle and also direct the projection in assembling the parts.

12 is a ferrule adapted to receive the handle; 13 threads in the base of the same for the bolt; and 14 a screw hole for fastening it to the handle. 15 is a counterbore in the base of the ferrule to make a better union of the washer with the same; and 16 is a rectangular perforation in the washer for the reception of the bolt. The screw-shank 6 of the bolt has its neck or base portion 4 square so that it cannot turn in the ways or washer when the handle is being screwed on the bolt.

The operation of the device will be apparent from the foregoing description. In use the base piece should first be screwed or fastened to the back of the brush, the bolt having been previously placed in the base piece; and the ferrule may then be screwed onto the bolt, and the handle adjusted as desired. Of course I may use any number of ways as explained, though four would answer every purpose.

I may also have any number of projections or teeth 8, as illustrated in the drawing, thus enabling a greater number of angles being possible in the use of the brush. The projection 9 takes in between the projections 8, and can also lie in the ways to lock the device; while the teeth 11 merely ride in the ways to prevent rotation. The square portion 4 of the screw-shank when in the ways locks the same against rotation, so that the handle may be rotated to screw or unscrew the same.

Having now fully described my invention, what I claim as new, and desire to secure by Letters-Patent, is:—

1. A brush clamp, comprising a hollow base formed with ways, stepped notches in the walls of said ways, a bolt having a ball on one end engaging said hollow base and a screw on the other, a ferrule adapted to receive the threaded portion of the bolt, a washer having an opening to receive the bolt and a depending rib to engage the notches in the sides of the ways and lock the ferrule to the base piece, and teeth extending into the ways to hold the bolt against rotation during the angular adjustment of the ferrule.

2. A brush clamp formed with a hollow base having ways and an opening at the intersection of the ways, stepped notches in the walls of said ways, a handle, a bolt having a screw on one end to engage said handle, an enlargement on the other to engage said hollow base and a square shank, a washer having a square perforation to receive the shank and provided with teeth extending into the ways to lock the same against rotation, and a depending rib adapted to engage the notches in the sides of the ways and lock the handle to the same.

3. A brush handle fastening comprising in combination a brush body, a hollow base on said body having transverse slots forming ways and an opening at the intersection of said slots, stepped notches in the walls of said ways, a bolt having a head engaging the hollow in said base and a shank provided with a square portion and screwthreaded portion passing through said opening, a freely movable washer on said bolt having a square opening in its center to engage the squared portion of the bolt and a depending rib engaging said notches, and an interiorly screwthreaded angularly adjustable handle engaging the screwthreaded portion of the bolt and abutting said washer, whereby rotation of the handle will advance the washer causing said rib to engage said notches and to lock the handle in adjusted position.

In testimony whereof I affix my signature.

GEORGE C. MORRISON.